United States Patent [19]

Campbell

[11] 4,312,701

[45] Jan. 26, 1982

[54] METHOD FOR DEFIBRATING WASTE PAPER AND DISPERSING CONTAMINANTS

[75] Inventor: Robert Campbell, Milwaukee, Wis.

[73] Assignee: Hydro-Thermal Corporation, Milwaukee, Wis.

[21] Appl. No.: 204,942

[22] Filed: Nov. 7, 1980

[51] Int. Cl.³ .............................................. D21C 5/02
[52] U.S. Cl. ........................................ 162/4; 162/61; 162/68
[58] Field of Search ...................... 162/4, 5, 21, 68, 61

[56] References Cited

U.S. PATENT DOCUMENTS 3,057,769 10/1962 Sandberg ................................. 162/4
3,736,223 5/1973 Marsh .................................... 162/4
3,741,863 6/1973 Brooks ................................... 162/4

*Primary Examiner*—William F. Smith
*Attorney, Agent, or Firm*—Andrus, Sceales, Starke & Sawall

[57] ABSTRACT

A method for defibrating waste paper and dispersing contained asphalt and wax contaminants within the fibers. The waste paper is initially pulped with water and the resulting stock is then contacted with a high pressure stream of steam having a velocity in the range of 1200 to 1600 ft./sec. The mixture of steam and stock is passed through a mixing tube under highly turbulent conditions to defibrate the waste paper and disperse any asphalt, waxes, and other contaminants throughout the separated fibers. The resulting stock can be used in papermaking processes, particularly for the production of paperboard products.

8 Claims, 3 Drawing Figures

METHOD FOR DEFIBRATING WASTE PAPER AND DISPERSING CONTAMINANTS

BACKGROUND OF THE INVENTION

Waste paper, commonly referred to as secondary fiber, is often used in the manufacture of paper and paperboard products. At present, the paperboard industry is the primary user of the recovered secondary fiber, and is moving toward the use of liner and corrugated media composed of all secondary fiber.

The secondary fiber frequently contains asphaltic materials, as well as waxes, and if the asphalt and waxes are not fully dispersed, they will appear as surface deposits which can result in a build-up on the press rolls of the paper machine and downgrade the finished board.

In a typical secondary fiber pulping system, the waste paper is introduced into a pulper and agitated with water to provide a stock having a solids content in the range of about 1% to 5%. After filtering through centrifuge cleaners and screens, the stock has traditionally been passed through an asphalt dispersion system in which the stock is thickened to a consistency of about 10% to 12% and then fed through a press where additional water is removed to raise the solids content to a range of 30% to 35%. The thickened stock is then introduced a into pre-heater where the stock is agitated and heated to a temperature of 250° F. to 325° F. to melt the asphalt and waxes. The stock is then blown into a cyclone or blowtank. At this point, water is added from the paperboard machine in order to decrease the solids content to a value of 4% to 5%. From the cyclone the stock is flowed to a stock chest and is pumped to the refiners immediately ahead of the papermaking machine.

In the conventional asphalt dispersion system substantial capital equipment has been required to thicken the stock to a solids content of about 30% to 35%, heat and defibrate the stock, and then return the stock to its approximate original consistency. Not only did the conventional system require substantial capital investment for equipment, but the energy costs were extremely high and considerable floor space was required for the equipment.

A variety of steam contact devices have been used in the past for heating liquids. Basic to all steam contact devices is the introduction of steam into the cold liquid utilizing a number of different device configurations, none of which are capable of heating a fibrous stock defibrating the fibers, and dispersing the contaminants with a single piece of equipment.

SUMMARY OF THE INVENTION

The invention is directed to an improved method of defibrating secondary fiber and dispersing any asphalt, waxes, and other contaminants, within the separated fiber. More particularly, the stock of secondary fiber, after pulping and passing through suitable filters, is fed to the inlet of a stock processing unit where it is passed into contact with a stream of high pressure steam having a velocity in the range of 1,200 ft./sec. to 1,600 ft./sec. The mixture of steam and stock is passed through a mixing tube under highly turbulent conditions which not only defibrates the secondary fiber, but also provides a complete dispersion of the asphaltic materials, waxes and other contaminants through the separated fibers.

With the present invention, the secondary fiber is heated, defibrated and the contaminants are dispersed through use of a single piece of equipment.

By use of the invention, a substantial reduction in capital investment is achieved over the conventional secondary fiber treatment processes. Due to the reduction in capital equipment, the maintenance and manpower costs are also substantially reduced.

The system of the invention also reduces energy costs and provides a considerable space saving over conventional systems, in that the space requirements are only about 1/10th of that required for the prior asphalt dispersion systems.

Lower grade waste paper cannot normally be used in the manufacture of paperboard for food containers, due to the offensive odor, bacteria and inadequate dispersion of other contaminants. However, the use of the high pressure steam serves to sterilize the stock and at the same time deodorize the stock, thereby enabling the stock treated by the system of the invention to be used in food board and food containers.

Because of the improved dispersion of waxes, asphalt, and other contaminants, lower grades of waste paper can be used in the manufacture of paperboard and other products, thereby reducing the overall material cost for the papermaking process.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
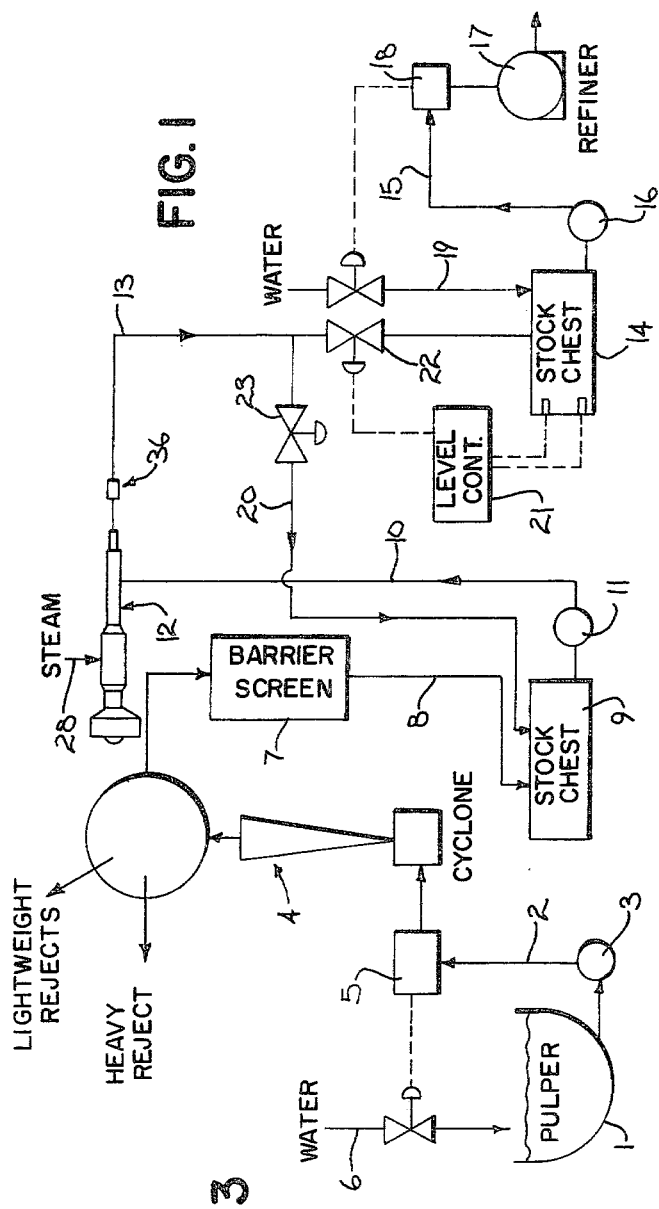
FIG. 1 is a schematic representation of a secondary stock system utilizing the method of the invention.
Figure 3:
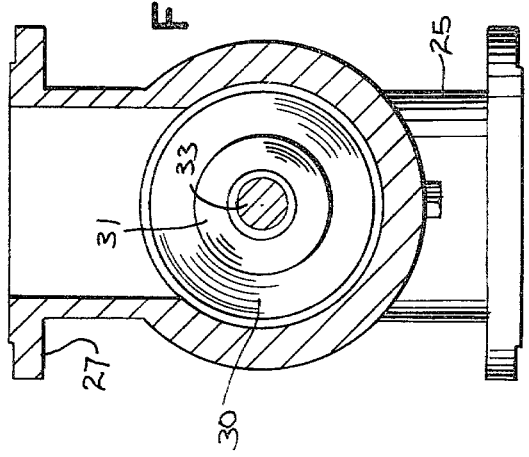
FIG. 3 is a section taken along line 3—3 of FIG. 2.

FIG. 1 illustrates a secondary stock system incorporating the present invention. The waste paper or secondary fiber is introduced into the pulper 1 and agitated with water to provide secondary stock having a solids content in the range of about 1.0% to 5% by weight. The stock is pumped from the pulper 1 through line 2 by pump 3 to a cyclone, indicated generally by 4, where both light and heavy foreign materials are removed from the stock.

Line 2 includes a conventional consistency regulator 5 which senses the consistency of the pulp passing through line 2 and automatically regulates the amount of water which is being introduced through line 6 to the pulper 1 to provide the desired solids content.

The stock being discharged from the cyclone 4 passes through barrier screen 7 where additional large size contaminants are removed and is then discharged through line 8 to stock chest 9. The stock is pumped through line 10 from stock chest 9 by pump 11 and is introduced to the stock processing unit, indicated generally by 12, where the stock is contacted by a high pressure, high velocity stream of steam which acts to separate the fibers and fully disperse the waxes, asphalt and other contaminants.

The stock is discharged from the processing unit 12 through line 13 to stock chest 14 and then is pumped through line 15 by pump 16 to the refiner 17. A consistency regulator 18, similar to regulator 5, is mounted in line 15 and senses the consistency of the stock and programs the addition of water through line 19, if necessary, to provide the desired stock consistency.

In the event there is a stoppage of the papermaking machine, in which case the stock cannot be discharged from the refiner 17 to the papermaking machine, a by-pass line 20 is connected between line 13 and stock chest 9. A liquid level control 21 in stock chest 14, senses the level of the stock and controls valves 22 and 23 in lines 13 and 20, respectively, to thereby return the stock to the stock chest 9 in the event the liquid level in stock chest 14 reaches a pre-set value.

The processing unit 12 includes an outer housing 24 having an inlet 25 connected to line 10 for the introduction of stock into stock chamber 26. In addition, housing 24 is provided with a steam inlet 27 which is connected by line 28 to a source of steam under pressure, and the steam inlet 27 communicates with a steam chamber 29.

Located between the steam chamber 29 and the stock chamber 26 is a nozzle 30, and a conical plug 31 is spaced from the inner surface of nozzle 30 and defines a tapered annular passage 32 therebetween.

Figure 2:
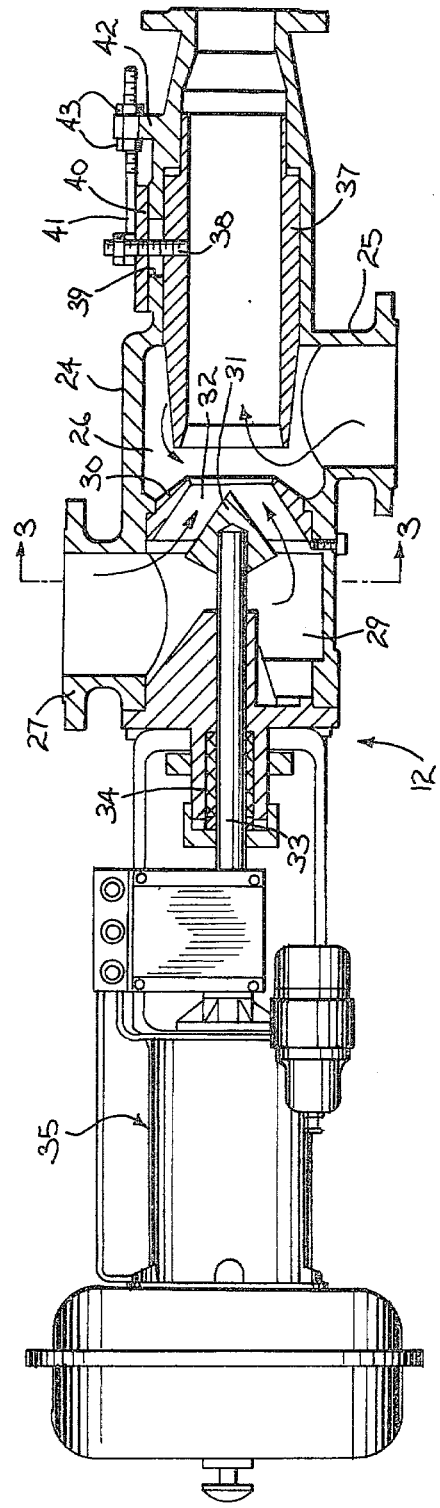
FIG. 2 is a longitudinal section of the stock processing unit.

The position of the plug 31 can be adjusted axially to vary the cross-sectional area of the passage 32 and thus vary the amount of steam being delivered through the unit. To provide the adjustment for plug 31, a stem 33 is connected to the plug and extends through a suitable packing 34 in the end of the housing 24. The outer end of the stem is connected to a conventional diaphragm-type pressure actuator 35. A temperature sensor 36 is located downstream of the processing unit 12 and senses the temperature of the stock being discharged from the unit. If the temperature falls beneath a pre-set value, the sensor will operate the actuator 35 to thereby move the stem 33 to the left, as shown in FIG. 2, to increase the cross-sectional area of the passage 32 and increase the amount of steam being delivered to the unit. Conversely, if the temperature of the stock rises above a pre-set limit, the sensor will operate the actuator 35 to decrease the cross-sectional area of passage 32 and reduce the supply of steam.

Mounted within the housing is a mixing tube 37, and the upstream end of the mixing tube is spaced from the discharge of the nozzle 30.

The spacing between the upstream end of the mixing tube 37 and the nozzle 30 can be varied to control the velocity of stock flowing into the mixing tube 37. In this regard, a stud 38 is threadedly connected to the mixing tube 37 and extends outwardly through a slot 39 in housing 24 and is attached to a bar 40 which is mounted for sliding movement on the outer surface of the housing. One end of a yoke 41 is connected to the outer end of the stud 38, while the opposite end of the yoke is threaded and is received within the opening in a lug 42 on the outer surface of housing 24. Lock nuts 43 are engaged with the threaded end portion of the yoke 41 and are located on either side of the lug 42. By loosening the lock nuts 43, the yoke 41 can be moved axially of the housing to correspondingly move the mixing tube 37. This adjustment provides a variation in the spacing between the upstream end of the mixing tube 37 and the nozzle 30 to regulate the velocity of stock entering the unit.

The stock entering the housing 24 through inlet 25 has a consistency in the range of 1% to 5% solids, a temperature in the range of 100° F. to 135° F., and a velocity of about 5 to 10 ft./sec. The steam entering the housing through the inlet 27 is at a pressure in excess of 20 psig and generally in the range of 50 to 100 psig. At the discharge end of the nozzle 30, the steam has a velocity in the range of 1200 to 1600 ft./sec. and preferably in the range of about 1400 to 1500 ft./sec.

The high pressure steam blasts against and into the stock which is flowing from the stock chamber 26 into the bore of the mixing tube 37, and creates tremendous turbulence within the mixing tube 37. This results in separation of the fibers in the stock, as well as heating the stock, so that the stock being discharged from the mixing tube has a temperature generally in the range of 170° F. to 230° F. The steam also serves to melt any asphalt contained in the stock as well as other wax-type contaminants, and the high turbulence will completely disperse these liquified materials within the fibers. This eliminates the possiblity of the asphalt being concentrated at the surface of the paper sheet subsequently formed in the papermaking process, and minimizes the build-up of asphalt on the press rolls of the paper machine.

The steam will completely condense within the mixing tube 37 and the stock being discharged from the mixing tube will have a consistency decrease in the range of 0.01% to 0.03% solids and will have a velocity of about 14 to 22 ft./sec.

As the system of the invention does not work the fibrous material to the extent that it is worked in conventional processes, the quality and finish of the paper product produced with the treated secondary fiber is believed to be superior to that of secondary fiber treated by conventional processes.

The steam also serves the additional function of sterilizing and deodorizing the secondary fiber. This enables the fiber to be used for applications, such as food product containers, where in many cases secondary fiber has not been usable.

Due to the thorough dispersion of the asphalt, the paper mills can utilize lower, less expensive grades of secondary fiber.

The system of the invention eliminates substantial capital equipment which was necessary in prior systems of secondary fiber treatment. More particularly, the capital expenditure required for the defibrator-asphalt dispersion system of the invention is only about 4% to 14% of that of conventional asphalt dispersion systems. Due to the reduction in amount of capital equipment required, maintenance, power demand and manpower requirements are reduced and great operating savings are achieved.

Various modes of carrying out the invention are contemplated as being within the scope of the following claims particularly pointing out and distinctly claiming the subject matter which is regarded as the invention.

I claim:

1. A method of defibrating waste paper and dispersing contained contaminants within the dispersed fibers, comprising the steps of contacting an aqueous stock of waste paper having a fibrous solids content of 1% to 5% by weight with steam at a pressure in excess of 20 psig and at a velocity of 1,200 to 1,600 ft./sec. to provide a steam-stock mixture, and flowing the mixture through a mixing tube under highly turbulent conditions to thereby heat the stock, separate the fibers of the stock and disperse any contained contaminants.

2. The method of claim 1, and including the step of flowing the stock into contact with the steam at a velocity of 14 to 22 ft./sec.

3. The method of claim 1, and including the step of sensing the temperature of the mixture downstream of the mixing tube, and adjusting the rate of flow of said steam to provide a substantially uniform temperature for the mixture.

4. A method of defibrating waste paper and dispersing contained contaminants within the dispersed ffibers, comprising the steps of passing steam at a pressure in excess of 20 psig through a nozzle in a housing to obtain a steam velocity in the range of 1,200 to 1,600 ft./sec., directing the steam into a mixing tube spaced axially of said nozzle, introducing an aqueous slurry of waste paper having a fibrous solids content of 1% to 5% by weight into the space in the housing between said nozzle and said mixing tube, and subjecting the mixture of steam and slurry to highly turbulent conditions in said mixing tube to thereby heat the slurry, separate the fibers in the slurry and disperse any contained contaminants throughout the separated fibers.

5. The method of claim 4, and including the step of flowing the slurry into the housing at a velocity of 5 to 10 ft./sec.

6. The method of claim 4, and including the step of maintaining the velocity of the mixture of steam and slurry at the downstream end of said mixing tube in the range of 14 to 22 ft./sec.

7. The method of claim 4, and including the step of adjusting the axial spacing between the nozzle and the mixing tube to establish the velocity of the slurry flowing to said space.

8. The method of claim 5, and including the step of maintaining the pressure of the steam entering said nozzle at a value of 50 to 100 psig.

* * * * *